Fig. 1

Purification and decomposition of
Active Thiourea - $C_6H_6$ - $C_6H_{12}$
Solid Phases:
⊙ Exp. A
△ Exp. B
□ Exp. C
↑⊙ - Point of break due to removal of adhering hydrocarbons.
↑ - Temperature raised to 100°

INVENTORS
Ludwig Rosenstein
Manuel H. Gorin

Fig. 2

Equilibrium diagram at 20°C. between solid and liquid phases for the system.
Thiourea - Benzol - Cyclohexane
⊙ Experimentally determined points.
△ Calculated points.

INVENTORS
Ludwig Rosenstein
Manuel H. Gorin
BY

ATTORNEY

Fig. 3

Equilibrium between Liquid and Adduct
$C_6H_{12} - C_6H_6$
Basis enrichment ratio 22

United States Patent Office 2,774,752
Patented Dec. 18, 1956

2,774,752

PROCESS FOR TREATING HYDROCARBONS WITH THIOUREA

Manuel H. Gorin and Ludwig Rosenstein, San Francisco, Calif.

Application January 31, 1951, Serial No. 208,816

11 Claims. (Cl. 260—96.5)

This is a continuation-in-part of our application Serial No. 169,288 filed June 20, 1950, now abandoned.

This invention relates to the formation of solid adducts between thiourea and various hydrocarbons and to the decomposition of such adducts.

It is known that certain hydrocarbons form adducts with thiourea, such hydrocarbons being certain isoparaffins, naphthenes, isoolefins, cycloolefins and those having a predominating member which is an isoparaffin radical or a naphthene radical such as an alkaryl hydrocarbon wherein at least one alkyl group is an isoparaffin radical of about six or more carbon atoms. In Patent 2,499,820 will be found a list of typical isoparaffins, isoolefins, cycloolefins and naphthenes which form adducts with thiourea. This patent states that such adducts may be formed with the pure hydrocarbon or with one or more of the hydrocarbons in a mixture with other adduct-forming materials or with non-hydrocarbon diluting materials, or impurities such as alcohol or water. The two types of hydrocarbons which form adducts with thiourea most readily are the highly branched isoparaffins and the unsubstituted naphthenes such as cyclopentane and cyclohexane.

The separation of benzol and cyclohexane is an example of hydrocarbon fractionation by the present invention. The production of benzol has become a matter of great national importance because of its use in aviation fuels and as an essential chemical raw material. Likewise, cyclohexane has become of national importance because of its relation to benzol synthesis and its use as a chemical raw material. It is, for example, the base for adipic acid manufacture.

Crude oils contain varying small amounts of cyclohexane and somewhat greater amounts of methyl-cyclopentane. The process of producing benzoyl from crude oil consists broadly of the steps of (a) producing a so-called "$C_6$" fraction containing largely the cyclohexane, methyl-cyclopentane and other hydrocarbons with six carbon atoms; (b) isomerizing this fraction to transform as much as possible of methyl-cyclopentane, and other $C_6$ hydrocarbons to cyclohexane; (c) subjecting the isomerization product to catalytic dehydrogenation either before or after separating residual unchanged methyl-cyclopentane.

Removal of hydrogen from cyclohexane results in the formation of benzol, but the dehydrogenation is not nearly complete and it becomes essential to separate cyclohexane from the product to conserve cyclohexane and to produce pure benzol. Where the aim is to produce a maximum of pure cyclohexane, the dehydrogenation step is eliminated and the cyclohexane is recovered from the isomerization product.

The hydrocarbon separation processes now generally practiced depend upon distillation, liquid-liquid extraction or on combinations of these. The difficulty involved in distillation will be apparent from the fact that the boiling points of benzol and cyclohexane differ by only 1.3° C., while liquid-liquid extraction processes suffer from the lack of any sharply selective solvent immiscible with one or the other of the components. Furfural, sulfur dioxide, and other solvents are used for such separations, but all leave much to be desired for the separation of cyclohexane and benzoyl.

The method of fractionation which we have invented depends upon (a) the discovery of an active form of thiourea, which has a remarkable ability to absorb, dissolve, or adduct certain hydrocarbons in a highly selective order without the aid of any accelerating substance such as methanol, water, $SO_2$, etc.; (b) the separation and purification of the solid phase; and (c) the decomposition of the solid phase to recover the desired component in a concentrated form, and to recover active thiourea in condition for recycle.

In our co-pending application, Serial No. 169,288, filed June 20, 1950, various means are described for preparing thiourea in the expanded form. All of these means involve decomposition of thiourea adducts of non-polar organic solvents, which are non-solvents for thiourea, in the absence of thiourea solvents and at temperatures below the melting point of thiourea. Expanded thiourea is characterized by a low bulk density of 0.45 gram per cc. or below and by its ability to form adducts rapidly with liquid cyclohexane as the sole reagent at room temperature; i. e., in the absence of thiourea solvents.

When thiourea is combined with an adductable component, the latter has penetrated and expanded the crystal lattice, thereby changing its fundamental dimensions. When the adduct-former is removed by the means described in our co-pending application referred to above, our expanded thiourea remains. The expanded form is unstable and reverts slowly at room temperature to the stable, denser form. Any thiourea solvent acts as a potent catalyst for this reversion.

In the course of our investigations we have also discovered compositions of matter not previously described which appear in our process. To simplify the process discussion we will first describe these new compositions of matter, and then point out their usefulness.

Adducts of thiourea with various organic compounds have been described, but it has been stated clearly by all previous investigators that simple aromatic hydrocarbons such as benzoyl, toluol, xylol and straight-chain paraffinic and olefinic hydrocarbons do not form such adducts with thiourea. Further, it is specifically stated that when adducts are formed from blends of naphthenes or isoparaffins with simple aromatic hydrocarbons, with the aid of accelerators such as those previously named, the solid phases or adducts contain none of the simple aromatic hydrocarbons and, similarly, when prepared from blends with straight-chain paraffinic or olefinic hydrocarbons, these are not contained as components of the solid phase.

Using our active thiourea without an accelerator, we have found just the opposite to be the case. For example, when active thiourea is added to any blend of cyclohexane and benzol, the solid phase which has been freed from mechanically held hydrocarbons always contains both benzoyl and cyclohexane, and we have found such solid phase to be homogeneous and of variable composition; in other words, it is a solid solution of hydrocarbons in thiourea and, more specifically, of benzol and cyclohexane in thiourea.

We have also discovered that without the aid of an accelerator we can form adducts from hydrocarbon vapors provided the thiourea is the active form described in our copending application.

It is in general the object of the present invention to provide a fractionation process utilizing active thiourea and wherein vapor phase operation is utilized in the formation or decomposition or both of an active thiourea solid phase.

Another object is to provide means of removing adherent hydrocarbons from adducts prior to decomposition of the adduct; thus attaining the maximum advantage of the selective action of active thiourea.

Another object of the present invention is to provide a process for formation of active thiourea by volatilization of an adduct-former from a solid phase which includes the adduct-former and thiourea.

The invention includes other objects and features of advantage, some of which, together with the foregoing, will appear hereinafter wherein the preferred practice of our invention is set forth.

The practice of the invention will become further apparent from the following wherein various examples are set forth by way of illustration.

*Example I.*—To illustrate the formation of a solid phase of thiourea and hydrocarbons, a mass of active thiourea was placed in a tube. A stream of natural gas was brought into approximate equilibrium with liquid cyclohexane at 22° C. by bubbling the gas through a body of the liquid cyclohexane; this gas was then passed through the tube. The gas passage was continued until no further gain in weight occurred, at which time it was determined that the active thiourea had increased by 37% of its initial weight. The solid was then removed from the tube and decomposed by heating in the presence of water; the liberated hydrocarbon recovered was identified by its refractive index as cyclohexane. This illustrates the selective absorption of a hydrocarbon from an inert gas stream by active thiourea.

In place of decomposing the solid by heating with water, the decomposition can be accomplished by passing a stream of gas over the solid at a temperature preferably elevated with respect to that at which the adduct was formed. It is preferred that the gas be the vapor of the adducted hydrocarbon provided the temperature and pressure are chosen so that the vapor pressure of the hydrocarbon from the solid is above the operating pressure. An inert gas may be used instead of the vapor of the adducted hydrocarbon, but the vapor of the adducted hydrocarbon is preferred for the reason that such vapor will be easier to condense and recover. Neither pressure nor temperature of decomposition are critical. They must be properly related and the temperature must be below the melting point of thiourea.

*Example II.*—To illustrate additionally the selectivity of active thiourea, a quantity of active thiourea was placed in a tube and a stream of natural gas carrying vapors of cyclohexane and benzol was passed through the tube until no further gain in weight occurred. The natural gas stream was approximately saturated by bubbling through a liquid consisting of 25% cyclohexane and 75% benzol at 24° C.

The resulting solid was decomposed with water and the released hydrocarbon identified by its refractive index which was 1.430 at 20° C. The refractive index of benzol at this temperature is 1.5012 and that of cyclohexane is 1.4266. The liberated hydrocarbon was estimated to contain approximately 96% cyclohexane and the balance benzol. The selectivity of thiourea as between cyclohexane and benzol is thus demonstrated as well as the ability of our active thiourea to absorb cyclohexane and benzol from a gas in which both are at very low concentration.

In our aforementioned copending application, we have shown how hydrocarbon can be adducted by introducing active thiourea into a liquid blend of hydrocarbons containing both adduct-formers and inert hydrocarbons. While the solid phase can be readily separated from the liquid as by filtering, the recovery of the uncontaminated adduct-formers and active thiourea presents a problem because a considerable amount of hydrocarbon adheres to the solid. In accordance with this invention, these adherent hydrocarbons are selectively evaporated by a stream of carrier gas or vapor, following which the solid can be decomposed by further passage of gas or vapor over it. Thus we accomplish substantially complete separation of the adherent from adducted hydrocarbons.

It is generally desirable to decompose the solid at a temperature elevated with respect to that at which it was formed to increase the rate of decomposition and reduce the amount of carrier gas required; this is not essential, however. A convenient method of accomplishing the decomposition is to use one or more of the hydrocarbons present in the solid in vapor form as a carrier gas, passing the carrier gas over the solid at a temperature at which the vapor pressure of the hydrocarbons from the solid is above the operating pressure. The following example will demonstrate this.

*Example III.*—A composition containing equal amounts by weight of cyclohexane, N-hexane, N-pentane and benzol was prepared. 150 grams of active thiourea was stirred into 200 cc. of the blend. After a contact period of approximately 10 minutes, the solid and remaining liquid were separated. A weighed portion of the filter cake was placed in a tube through which a metered stream of natural gas was passed at 20°–24° C. At defined intervals, the loss of weight was determined. Initially, the loss of weight was quite rapid due to the evaporation of the excess hydrocarbons clinging to the surface of the complex. As soon as this excess had evaporated, the flow of gas upwards maintained the adduct in a constant state of agitation in the tube; this state is commonly known as a "fluidized condition," and the rate of weight loss slowed down to less than 6% of the previous rate, this being due to the much slower liberation of hydrocarbon from the adduct. From data thus obtained the composition of the adduct and the vapor pressure of cyclohexane in equilibrium with the adduct were determined. The average of several such runs gave the composition of the adduct as 73% thiourea and 27% hydrocarbon. The vapor pressure of cyclohexane in equilibrium with the adduct at 22° C. is approximately 5 mm. Hg. The vapor pressure of pure cyclohexane at 22° C. is 87.5 mm. Hg.

While in the foregoing we have mentioned natural gas as an example of the inert gases which are convenient carriers, the invention is not so limited and one can use any other gas which does not react under the conditions of purification of the adduct with the thiourea or the adduct-former. Further, one can use a condensible vapor such as butane, or the removal of adhering hydrocarbon can be carried out at a pressure below atmospheric utilizing a suitable vapor such as that of pentane, hexane or benzol. Further, the temperature mentioned of 20°–24° C. is not critical and one can use a lower or a higher temperature; the temperature should not attain a point whereat the vapor pressure of the adduct-former from the adduct approaches that of the pure adduct-former. The step of evaporation of adhering hydrocarbons without appreciable loss of adducted cyclohexane has been carried out at 35° C. with a considerable increase in rate.

It will also be apparent that the removal of the unadducted hydrocarbon can be carried out by application of a partial vacuum at a temperature where the vapor pressure of the adduct-former is a small part of the total pressure applied to the adduct.

The heat of evaporation of the hydrocarbon present on the surface of the adduct must be supplied from either the surroundings by heat transfer through the walls of the enclosing vessel or by heat carried by the gas or vapor supplied to accomplish the evaporation of the inert and non-adducted components. Because of the ease of supplying the necessary heat and the ease of condensation, we prefer to use a carrier vapor rather than a non-condensible gas or partial vacuum.

*Example IV.*—To illustrate further the practice of the present invention, a stream of cyclohexane vapor was passed at 100° C. over a previously formed adduct of active thiourea and cyclohexane; the adduct resolves rapidly at this temperature into its components. The solid phase which remained was in highly active form, so active, in fact, that it rapidly absorbed at room temperature cyclohexane from a gas stream containing only a few percent thereof. The temperature of 100° C. is illustrative only and one can employ any temperature compatible with retaining the activity of the recovered solid phase thiourea. An advantage in utilizing the higher temperatures is the reduction in vapor volume. We have operated successfully at lower temperatures of the order of 60° C. utilizing sub-atmospheric pressure. The decomposition rate was still amply fast for commercial purposes.

The process of this invention is applicable to the various adduct-formers. For example, the adduct formed between isooctane and active thiourea can be conveniently purified by evaporating adhering hydrocarbons by passing a stream of inert gas at room temperature over the adduct and then decomposing by passing isooctane vapor at an elevated temperature over the remaining dry adduct.

*Example V.*—A stream of natural gas was saturated at 22° C. with each of the hydrocarbons given in Table I. The stream was passed in each instance over a mass of active thiourea, after the manner of Example I. The adduct formed in each case was divided into equal portions which were then, respectively, decomposed as in Examples III and IV, the adduct-former and the thiourea being separately recovered and the adduct-former identified in each instance as that utilized to saturate the natural gas.

TABLE I

Isoparaffin hydrocarbons:
    Isopentane
    Isooctane
    2,3-dimethylbutane
    2,2,3-trimethylbutane
Naphthenes:
    Methyl cyclopentane
    Cyclohexane
    Methylcyclohexane
    Ethylcyclohexane
    1,2-dimethylcyclohexane
    1,3-dimethylcyclohexane
    1,4-dimethylcyclohexane
    Decalin
Isoolefins:
    Diisobutylene
    Triisobutylene

*Example VI.*—Various binary mixtures of hydrocarbons were treated with active thiourea as described in Example II. In table II are given the composition of the original mixtures and the identity of the predominating hydrocarbon in the adduct when separated as in Example I.

TABLE II

| Sample | Mixture | Hydrocarbon predominating in Adduct |
|---|---|---|
| A | 50% normal heptane, 50% isooctane | Isooctane. |
| B | 95% normal heptane, 5% triptane | Triptane. |
| C | 90% normal heptane, 10% triptane | Do. |
| D | 80% normal heptane, 20% triptane | Do. |
| E | 75% normal heptane, 25% 2,3-dimethylbutane | 2,3-dimethylbutane. |
| F | 50% normal heptane, 50% cyclohexane | Cyclohexane. |
| G | 95% normal heptane, 5% cyclohexane | Do. |
| H | 50% normal heptane, 50% methylcyclohexane | Methylcyclohexane. |
| I | 50% 1,2-dimethylcyclohexane, 50% 1,4-dimethycyclohexane | Dimethylcyclohexane. |
| J | 50% 1,4-dimethylcyclohexane, 50% ethylcyclohexane | Ethylcyclohexane. |

*Example VII.*—The present invention also contemplates the separation of two or more hydrocarbons, each of which form a stable solid phase with thiourea, advantage being taken of the difference in stability of the solid phase with respect to the separate hydrocarbons. To a mixture of 100 grams of cyclohexane and 100 grams of methylcyclopentane, 82.1 grams of active thiourea (prepared as in Example IV above) were added; this amount of active thiourea was insufficient to adduct with all of the hydrocarbons present. After a contact period of ten minutes at room temperature, the solid complex was filtered by suction and then spread out to dry at room temperature for 20 minutes. The solid phase at this stage contained 25.7% of hydrocarbon, as was determined from its gain in weight. The solid phase was then separated into two fractions, one of which was completely decomposed by heating to 80° C. in the presence of water and the hydrocarbons recovered and found to comprise (by refractive index) 80.6% by weight of cyclohexane and 19.4% by weight of methylcyclopentane.

The other portion of the solid phase was placed in an absorption bottle and partially decomposed by passing natural gas over the adduct at about 70° C. This was continued until the hydrocarbons released from the solid phase amounted to 6.5% by weight of the original; the hydrocarbons were recovered and analyzed and were found to contain 70.3% cyclohexane and 29.6% methylcyclopentane. The remaining solid was then completely decomposed, the hydrocarbons recovered, and found to contain 84.7% cyclohexane and 15.3% methylcyclopentane. The weight ratio of the original hydrocarbons was unity; this ratio was changed to 4.15 by selective transfer to the solid phase and 5.5 by combining selective adduction with one step of selective decomposition. It will be seen from this that better than a five-fold concentration of the cyclohexane was accomplished by these operations. Even greater concentration of the cyclohexane can be accomplished by utilizing a lower temperature for the initial decomposition.

It is not necessary that the active thiourea be added to liquid phase hydrocarbons in one lot; we find it generally desirable to carry on the addition stepwise, as in this way the volume of solid adduct with respect to liquid volume remains in more manageable proportions. One way to accomplish this is to spread the active thiourea over a number of plates in an absorption column into which the liquid hydrocarbons are introduced.

The following example illustrates one method of applying the present invention to the improvement of the octane number of an alkylate.

*Example VIII.*—The alkylate used as a starting material was the crude alkylate produced by reacting isobutane with butylene in the presence of cold sulfuric acid. The crude alkylate was first distilled into two fractions, one a fraction A containing those materials boiling below 106° C., and a fraction B containing those components boiling above this temperature. Fraction A contained the 2,2,4 trimethylpentane and lighter fractions. Fraction B was then distilled to produce two fractions, one a fraction D containing those components having a boiling range from 106° C. to 135° C. and a fraction C containing those components boiling above 135° C. Fraction D was then treated with thiourea, the quantity of thiourea being sufficient to combine with only a portion of this fraction. Those hydrocarbons from fraction D not entering the thiourea solid phase were separated off as raffinate and designated "F." The thiourea complex was then decomposed by passing a stream of hot inert gas therethrough and the effluent was condensed, thus effecting a separation of the gas from the hydrocarbon, the liquid hydrocarbon so recovered being hereafter designated "E." Fractions A and E were then combined and were found suitable for use as a high octane aviation gasoline. Fractions C and F were combined and it was found that this mixture had a substantially lower octane number than the A and E combination, but nevertheless D and F mixture was suitable for use as a high grade motor gasoline. In the above experiment, it is apparent that fraction A contained substantially all of the 2,2,4 trimethylpentane which was in the alkylate, while fraction D contained the remainder of the octanes. In the octane mixture, the trimethylpentanes, including 2,2,3 trimethylpentane, 2,3,3 trimethylpentane and 2,3,4 trimethylpentane, have the highest octane numbers and also are selectively absorbed by thiourea. On the other hand, those octanes having only one or two branches in the chain, such as 2,4-dimethylhexane, 2,3 dimethylhexane, 2,5 dimethylhexane, 2 methylheptane, 3 methylheptane and 4 methylheptane, have lower octane numbers and are the minor components of the hydrocarbon in the solid phase.

*Example IX.*—To illustrate further and in greater detail the utility of the invention as applied particularly to cyclohexane-benzol mixtures, the blends shown in Table III of pure cyclohexane and benzol were prepared:

TABLE III

|   | Percent by weight | | Ratio: $C_6H_{12}/C_6H_6$ | Refractive Index, 20°/D |
|---|---|---|---|---|
|   | Benzol ($C_6H_6$) | Cyclohexane ($C_6H_{12}$) | | |
| A | (100% A. C. S. C. P.) | 0 | ------ | 1.5006 |
| A | 97.5 | 2.5 | .0256 | 1.4982 |
| B | 95.0 | 5.0 | .0527 | 1.4960 |
| C | 90.0 | 10.0 | .1111 | 1.4906 |

Figure 1:
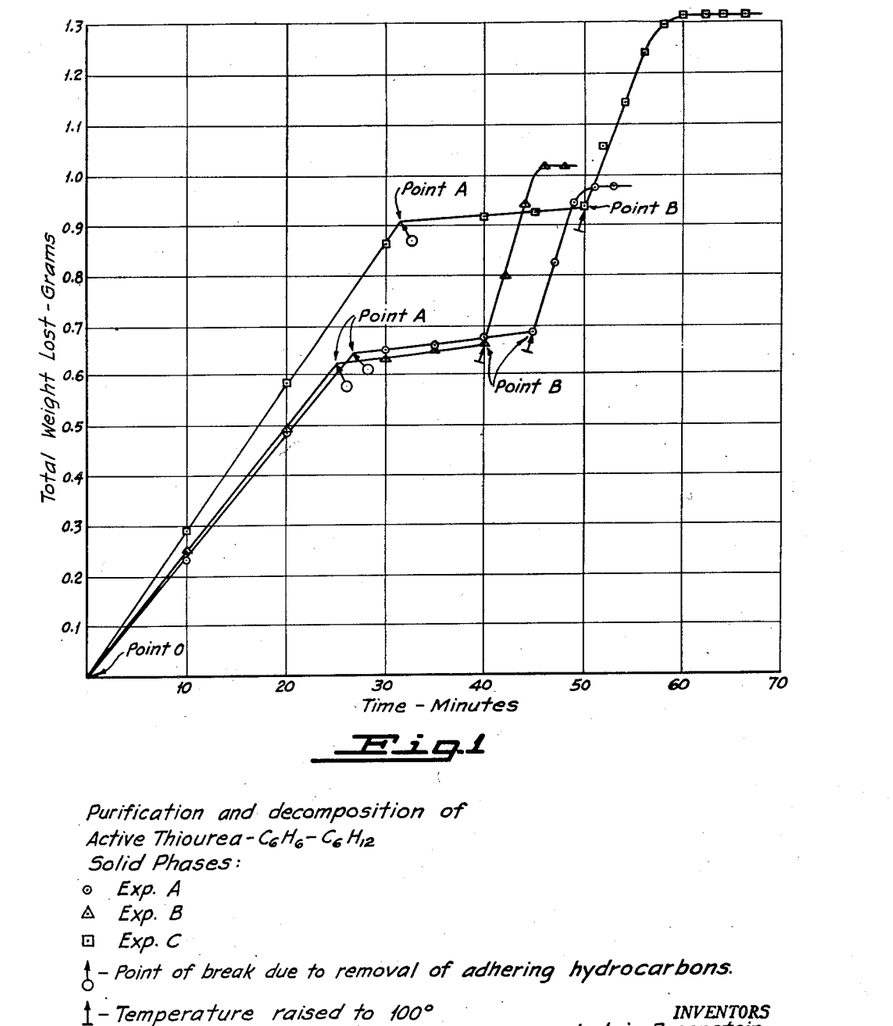
Figure 1 illustrates the loss in weight at several temperatures for three adducts of benzol and cyclohexane with thiourea when an inert gas is passed at a predetermined rate through a column of adduct which is wet with adherent hydrocarbon.

To 100 grams of each of these blends, 13.2 grams of active thiourea were added and the mixture allowed to stand till equilibrium was substantially reached, following which the phases were separated by suction filtration. In each case the solid, wet with adherent liquid, was treated with a slow, constant stream of inert gas (natural gas) at room temperature of about 20° C., and the loss in weight determined at regular intervals. Figure 1, in which the loss in weight is plotted as ordinates and the elapsed time as abscissa, shows the results graphically. The original weight of samples was obviously 13.2 grams plus the loss in weight when the adducts were completely decomposed.

To achieve complete decomposition of the solid phase into its components, it was finally heated to about 100° C. while passage of the stream of inert gas was continued until constant weight was reached. In each case the residual solid was pure thiourea in a highly active state.

The interpretation of the graphically shown results of Figure 1 is as follows:

1. Section OA of the lines represents the evaporation of adherent hydrocarbon liquid. This rate is constant because the composition and vapor pressure of the mechanically held liquid do not change appreciably as it evaporates.

2. The sudden break at A in the line represents the instant at which all mechanically held hydrocarbon has disappeared and following which the evaporation rate is reduced to that of the hydrocarbon-mixture in the solid solution; Section AB represents this phase. Point B in Figure 1 corresponds to the start of the heating period and the following horizontal portion to complete decomposition.

Thus far, the experimental evidence proves the existence of a solid phase of thiourea and hydrocarbon, and the total hydrocarbon content of this solid phase follows at once from the hydrocarbon retained at the time of the break at point A.

The composition of the hydrocarbons in the solid phase will next be established.

Consider the figures in Table IV for the composition of the "raffinates" from these three experiments. (The "raffinate" is the liquid removed by filtration; the hydrocarbons in the solid phase will hereafter be referred to as "extract".)

TABLE IV

*Composition of raffinate*

|   | Refractive Index, 20°/D | Percent by Weight | | Ratio $C_6H_{12}/C_6H_6$ |
|---|---|---|---|---|
|   |   | Benzol | Cyclohexane |   |
| A | 1.4990 | 98.51 | 1.49 | .0151 |
| B | 1.4973 | 96.84 | 3.16 | .0326 |
| C | 1.4926 | 91.90 | 8.10 | .0882 |

From these values it is clear that the raffinate was depleted in cyclohexane.

Both benzol and cyclohexane are present in the solid phase; from a separate portion of the solid phase, adherent hydrocarbon was evaporated as described, the remaining solid decomposed completely with water. The recovered hydrocarbon layer was dried and analyzed, the results obtained being given in Table V:

TABLE V

*Composition of extract*

|   | Refractive Index, 20°/D | Percent by Weight | | Ratio $C_6H_{12}/C_6H_6$ |
|---|---|---|---|---|
|   |   | Benzol | Cyclohexane |   |
| A | 1.4760 | 73.5 | 26.5 | .360 |
| B | 1.4650 | 59.5 | 40.5 | .681 |
| C | 1.4480 | 36.2 | 63.8 | 1.770 |

From the composition of the extract (Table V) and the separately determined percentages of total hydrocarbons in the solid phase, the complete composition of the solid phases in equilibrium with the raffinates (Table IV) were calculated, the data being given in Table VI.

TABLE VI

*Composition of solid phases*

|   | Percent total H. C. | Percent T. U. | Percent $C_6H_6$ | Percent $C_6H_{12}$ |
|---|---|---|---|---|
| A | 24.4 | 75.6 | 17.9 | 6.5 |
| B | 27.2 | 72.8 | 16.2 | 11.0 |
| C | 27.0 | 73.0 | 9.8 | 17.2 |

Figure 2:
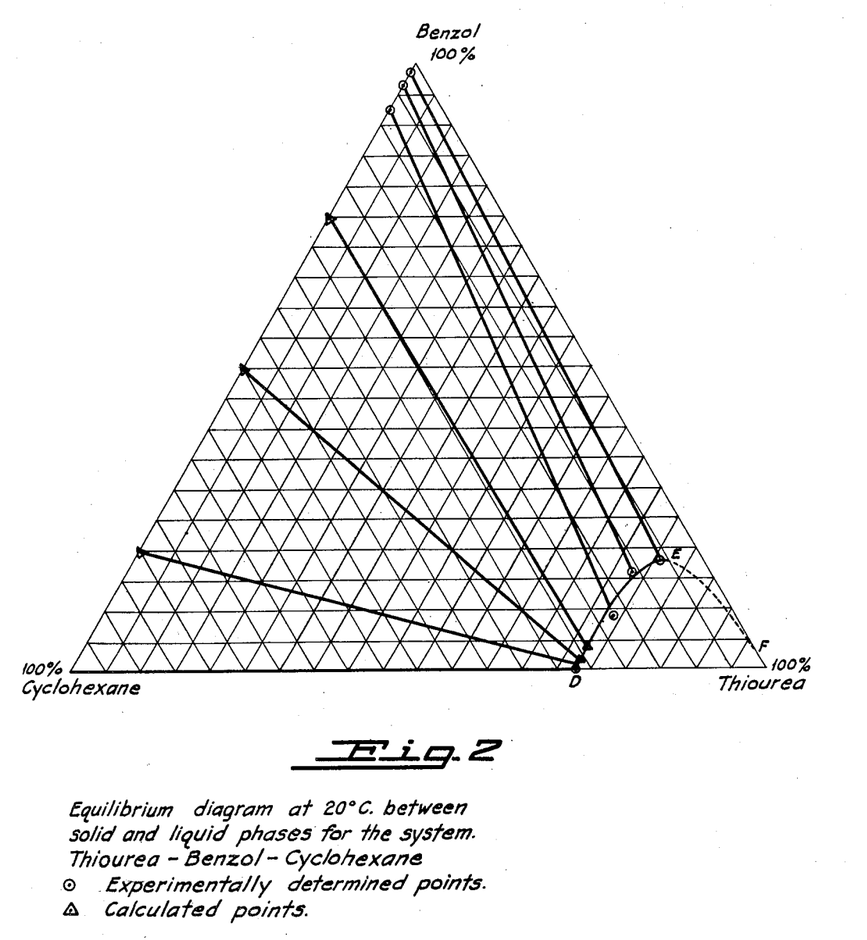
Figure 2 is a ternary diagram showing the compositions of solid and liquid phases when these are in equilibrium, for the system thiourea-benzol-cyclohexane.

These values can be shown graphically on a triangular diagram and to make the diagram more complete, we include the composition of the solid phase of thiourea with pure cyclohexane and with pure benzol. The former was determined by the described methods (see Example I) and found to contain 73% thiourea and 27% cyclohexane. In this diagram, points on the line AC represent blends of cyclohexane and benzol in various proportions. The solid lines drawn from these points and terminating on the curve DE are the "tie-lines" which relate the liquid composition with that of the solid-phase in equilibrium with it and consisting of cyclohexane-benzol-active thiourea.

The point D on line AB gives the composition of the solid phase consisting only of cyclohexane and active thiourea and saturated with respect to the former. The point F on line BC is the surmised terminus of the curve DE. This point may coincide with point B, but in any case is below 4% benzol-96% active thiourea.

Parallel experiments with pure benzol gave ambiguous results. If a solid-phase of benzol and thiourea exists at this temperature it contains less than 4% benzol. Our present opinion is that such solid phase does not exist at 20° C., but does exist at a lower temperature.

The equilibrium relations are shown on the triangular diagram of Figure 2 in which the points marked with circles are those experimentally determined, while those marked with triangles were calculated by methods which will now be explained.

From the ratios given in the last columns of Tables IV and V, we calculated a value which we term the "enrichment ratio" and which represents the selective action of the active thiourea with respect to cyclohexane. It is given by the equation:

$$E = \frac{R_1}{R_2}$$

in which E is the "enrichment ratio," $R_1$ the ratio $C_6H_{12}/C_6H_6$ in the extract, and $R_2$ this ratio in the raffinate. Table VII gives the results.

TABLE VIII

E

A ______________________________________ 23.8
B ______________________________________ 20.6
C ______________________________________ 22.2

Average ________________________________ 22.2

Attention is called to the substantial constancy of this "enrichment ratio." Using the average value of E, we have calculated the points marked with triangles in Figure 2 and these are given in Table VIII:

TABLE VIII

| Raffinate | | Extract | | Solid phase | | |
|---|---|---|---|---|---|---|
| $C_6H_{12}$ | $C_6H_6$ | $C_6H_{12}$ | $C_6H_6$ | T. U. | $C_6H_{12}$ | $C_6H_6$ |
| Percent | Percent | Percent | Percent | Percent | Percent | Percent |
| 25 | 75 | 88 | 12 | 73.0 | 23.8 | 3.2 |
| 50 | 50 | 95.7 | 4.3 | 73.0 | 26.0 | 1.0 |
| 80 | 20 | 98.9 | 1.1 | 73.0 | 26.7 | 0.3 |

From this, it is evident that active thiourea acts as a highly selective extractant towards cyclohexane in benzol. The "enrichment ratio" is the parallel of what is generally known as the "volatility ratio" in the case of separation by distillation, and it will be of interest to compare this enrichment ratio of about 22 with the volatility ratio for cyclohexane-benzol at 20° C., which is about 1.05.

Figure 3:
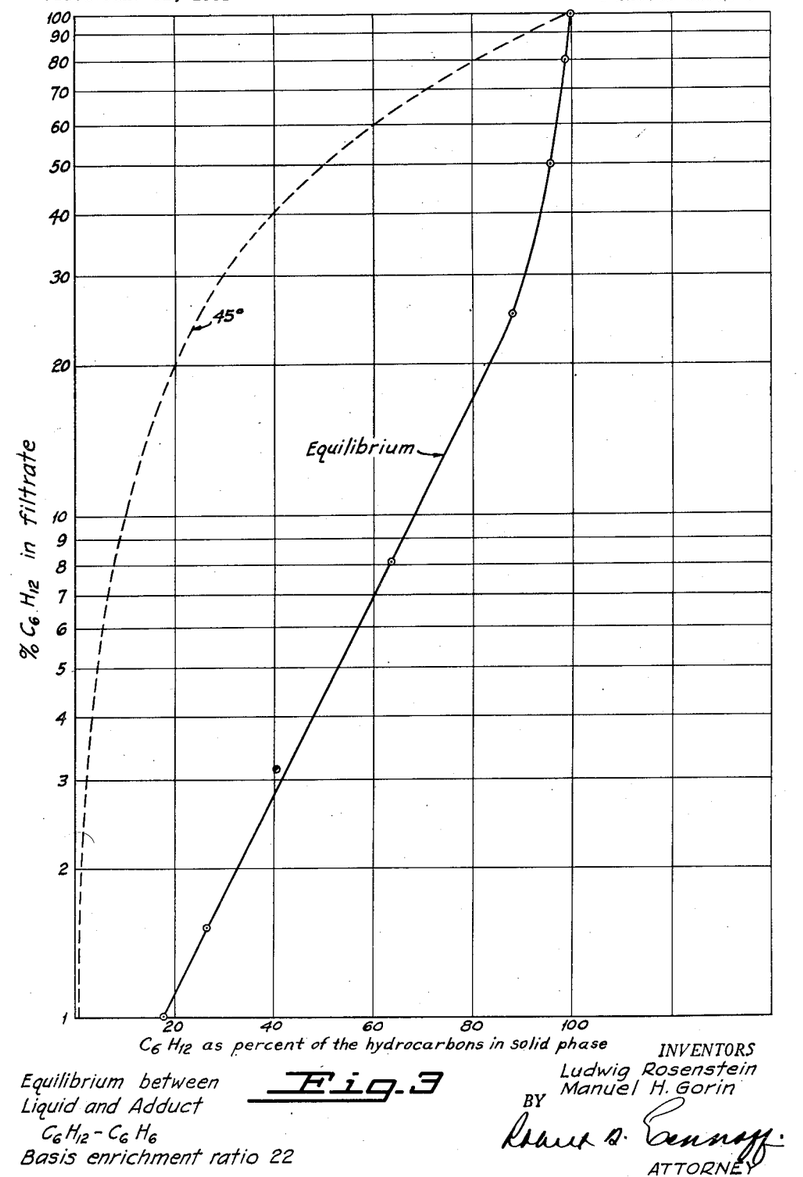
Figure 3 is a diagram showing the equilibrium relationship between cyclohexane in liquid phase and in the hydrocarbon portion of the solid phase for the system thiourea-cyclohexane-benzol.

Instead of the triangular diagram, the results can also be shown by plotting the percent cyclohexane in solid phase against its concentration in the equilibrium filtrate. This gives, in effect, a McCabe and Thiele diagram (see Elements of Fractional Distillation, Robinson and Gilliland, McGraw-Hill, 1939, p. 89 et seq.), which can be used directly to determine the number of extraction steps required to achieve some predetermined degree of enrichment or purification. Such a diagram is shown in Figure 3 in which, for the sake of convenience, the ordinates are ploted on a logarithmic scale. The dotted line in this diagram is the 45° line of the usual McCabe and Thiele diagram with linear coordinates.

Because the solid phase is a continuation of solid solutions there is no lower limit to the ability of active thiourea extracting cyclohexane from benzol. In other words, even trace of cyclohexane can be removed from benzol.

Thus far we have developed the degree of enrichment which can be achieved by extraction with active thiourea. Further enrichment can be achieved by controlling the recovery of hydrocarbons from the solid solutions and one manner of attaining this is as follows:

After adherent hydrocarbon has been evaporated, the solid solutions will liberate their hydrocarbon content in proportion to the vapor pressures from the solid phase of the respective hydrocarbons. We have found that the vapor pressure of benzol over all solid solutions containing cyclohexane and benzol is considerably greater than the vapor pressure of cyclohexane. Consequently the concentration of cyclohexane in the vapors will increase progressively as decomposition takes place. We have developed quantitative values to illustrate this effect by proceeding as follows:

*Example X*—Solid solutions of cyclohexane and benzol in active thiourea were subjected to successive steps of decomposition by contact with a constant stream of inert gas at about 75° C. At different stages of the decomposition, samples of the residual material were analyzed. Table IX gives the results of three such experiments.

TABLE IX

*Composition of solid solutions at different stages of decomposition*

| | Experiment D | | | Experiment E | | | | Experiment F | | |
|---|---|---|---|---|---|---|---|---|---|---|
| Percent decomposition | 0 | 33 | 66 | 0 | 50 | 66 | 83 | 0 | 33 | 66 |
| $C_6H_{12}$ ________ percent | 33.3 | 43.6 | 50.5 | | 19.7 | 28.0 | 33.7 | 63.5 | 71.6 | 76.1 |
| $C_6H_6$ ____________ do | 66.7 | 56.4 | 49.5 | | 80.3 | 72.0 | 66.3 | 36.5 | 28.4 | 23.5 |
| Ratio: $C_6H_{12}/C_6H_6$ __ do | 0.50 | 0.77 | 1.02 | | .245 | .39 | .50 | 1.74 | 2.52 | 3.26 |

Figure 4:
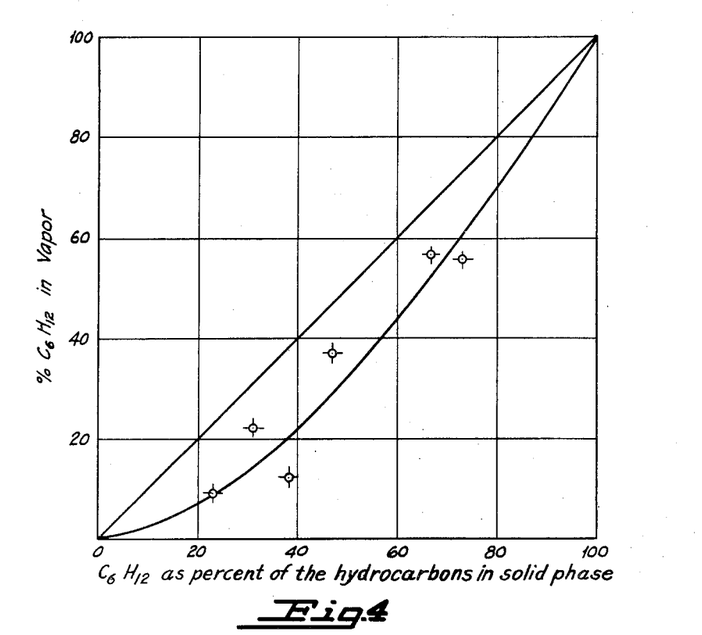
Figure 4 shows the relationship between percent of cyclohexane in the vapor phase and in the hydrocarbon portion of the solid phase when these are in equilibrium.

From the composition of the residual solid phase we can calculate the average composition of the vapor evolved in going from one stage of decomposition to the next, and these figures can be represented graphically in what is, in effect, another McCabe and Thiele diagram. Figure 4 is such a diagram, and from this the successive enrichment of solid with respect to cyclohexane and of vapor with respect to benzol will be seen.

In describing these experiments and the results, we have given the essentials of our process of fractionation of hydrocarbons by means of our active thiourea, and we have at the same time disclosed new compositions of matter consisting of a series of homogeneous crystalline solids containing thiourea, cyclohexane and benzol in varying proportions which are in fact solid solutions.

To summarize the steps in our process of fractionating hydrocarbons and specifically of fractionating a blend of cyclohexane and benzol:

Step 1: Contact the hydrocarbon phase with active thiourea at ordinary temperature. The temperature, while not critical, must be in the range in which the solid solutions exist, and is at the same time sufficiently elevated so that equilibrium is reached with practical speed. We recommend a temperature between 10° C. and 50° C., preferably about 30° C. The time of contact depends on the activity of the thiourea on the concentration of cyclohexane in the hydrocarbon and on the temperature. With good agitation and temperature of about 25° C., we have found that 15 minutes is in general sufficient for practical purposes when active thiourea was prepared as described in Example IV.

Step 2: The solid phase is separated from the liquid by filtration, sedimentation or other convenient means. The adherent hydrocarbons are removed from the wet solid by vaporization. A stream of inert gas, or reduced pressure may be employed and the required heat of vaporization provided in any well-known manner. Here again temperature is not critical; we prefer to operate between 30° C. and 50° C.

Step 3: When adherent hydrocarbons have been substantially removed, the temperature is raised to a point where the liberation of adducted hydrocarbons from the solid phase becomes sufficiently rapid for practical purposes. We prefer a temperature between 75° C. and 100° C. One convenient means of achieving decomposition is to use the vapors of one or both of the hydrocarbons present in the solid phase. For example, in the specific case mentioned, where the objective is to obtain a product enriched with respect to cyclohexane, it is desirable to use a vapor of the same composition as that of the hydrocarbon in the solid phase. As we have shown, further enrichment can be achieved by decomposing the solid phase step-wise. In this the composition of the vapors used for decomposition should be chosen accordingly. The use of vapors of the hydrocarbons in the solid phase is advantageous because it makes for good and rapid heat transfer and ease of condensation, and avoids the necessity of recovering condensible vapors from a non-condensible gas. Instead of decomposition by hot vapors, we can also heat directly at atmospheric or sub-atmospheric pressure, and the solid phase can be in a finely divided form and supported in a fluidized condition by its own vapor, thus favoring good heat transfer.

Step 4: As was previously shown, the thiourea produced by decomposition of solid phase as described is in a highly active state, so much so that it is capable of absorbing cyclohexane and benzol from a gas stream containing both to form solid solutions similar to those already described. However, it may be desirable to form the solid solution as described in Step 1, in which case the active thiourea is returned to Step 1.

It will also be clear that our process can operate cyclically entirely by solid-vapor contact so arranged that the solid is never moved and never wet with adherent hydrocarbons, so that Step 2 can be eliminated.

Previously we have pointed out that alkylated aromatic hydrocarbons wherein at least one alkyl group is an isoparaffin radical of at least six or more carbon atoms are among the organic compounds which form adducts with thiourea. The application of our process to the segregation of these alkaryl hydrocarbons from paraffine hydrocarbons and other compounds which do not form adducts with thiourea will be clear from the following example:

*Example XI.*—10 grams of active thiourea prepared as described below was agitated for 30 minutes at room temperature with 50 cc. of alkylated benzene produced by the reaction of propylene tetramer with benzene. After filtration the solid was washed with methylene chloride, air dried and weighed. It was found to have combined with 2.5 grams of alkyl benzene (alkylate).

The active thiourea was prepared as follows:

One hundred and fifty grams of thiourea were agitated at room temperature with 300 cc. of carbon tetrachloride. Reaction was immediately apparent from the swelling of the thiourea. After 15 minutes, the mixture had set up to a stiff suspension and stirring was discontinued. The mixture was then spread out thinly on a sheet of paper and allowed to dry at room temperature until all the wetting of the paper by the solid had disappeared. At this stage, the adduct weighed 224.8 grams and contained 33.3% by weight of CCl₄. It was again spread out thinly on a sheet of paper and allowed to remain in contact with air at room temperature for 24 hours, after which time it had returned to its original weight of 150 grams and had lost all the CCl₄ originally present in the adduct. At this stage, the thiourea has a very different physical appearance than ordinary thiourea, being light and fluffy instead of dense and granular and having a gross volume approximating that of the original adduct.

We claim:

1. A process for forming an adduct with expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, comprising passing a gas stream, containing at least one hydrocarbon capable of forming an adduct with thiourea, over a mass of said expanded thiourea as the sole reagent at a temperature below approximately 60° C. and for a contact time of less than one hour to form an adduct of thiourea and said hydrocarbon.

2. A process for forming an adduct with expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, comprising passing a gas stream containing at least one hydrocarbon of the group consisting of isoparaffins, naphthenes, isoolefines, cycloolefines, and alkylated aromatic hydrocarbons having at least one isoparaffin radical of at least six carbon atoms over a mass of said expanded thiourea as the sole reagent at a temperature below approximately 60° C. and for a contact time of less than one hour to form an adduct of at least one of said hydrocarbons and said expanded thiourea.

3. In a process for producing a thiourea adduct containing cyclohexane the step of contacting expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, with a hydrocarbon fraction containing cyclohexane at a temperature below 60° C. and for a contact time not exceeding one hour.

4. In a process for producing an adduct of thiourea and more than one hydrocarbon at least one of which is selected from the group isoparaffins, naphthenes, isoolefins, cyclo-olefins, and alkylated aromatic hydrocarbons having one isoparaffine side-chain of at least six carbon atoms, the step of contacting below 60° C. and for a time not exceeding one hour expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, with the hydrocarbons.

5. A process for decomposing an adduct of thiourea and hydrocarbons said adduct being free of thiourea solvent with vapors of hydrocarbons of substantially the same composition to those released from the adduct, at an elevated temperature below the melting point of expanded thiourea, and for a time substantially sufficient to decompose said adduct and compatible with leaving a residue consisting substantially of expanded thiourea, characterized by a bulk density of substantially 0.45 gram per cc. and also characterized by reactivity which enables complete adduct formation when said thiourea is used as the sole reagent with liquid cyclohexane in a contact period at room temperature not exceeding one hour.

6. In a process of fractionating a hydrocarbon blend, said blend containing components which will form adducts with thiourea, the steps of forming the adduct of said components of the hydrocarbon blend with expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, said adduct being wet by adherent, non-adducted hydrocarbons, purifying the adduct by evaporation of the said adherent hydrocarbons into a gas stream, decomposing the purified adduct by applying hot vapor whose composition is substantially the same as that of the adducted hydrocarbons and collecting the resultant hydrocarbons.

7. In a process for fractionating mixed hydrocarbons contained in a gas stream, at least one of said hydrocarbons being capable of forming a solid adduct with expanded thiourea, the steps of: (1) contacting said gas stream with a mass of expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, at a first temperature to form adduct, and (2) contacting the adduct with a stream of hydrocarbon gas at a second temperature between the first temperature and the melting point of expanded thiourea for a time substantially sufficient to decompose said adduct and compatible with leaving a residue consisting substantially of said expanded thiourea.

8. In a process for the separation of naphthenic from aromatic hydrocarbons, the steps comprising (1) forming an adduct of thiourea by mixing, as the sole reagent, with a hydrocarbon fraction containing naphthenic and aromatic hydrocarbons, solid thiourea in the expanded state characterized by a bulk density of substantially 0.45 gram per cc. and also characterized by reactivity which enables complete adduct formation when said thiourea is used as the sole reagent with liquid cyclohexane in a contact period at room temperature not exceeding one hour; the quantity of said thiourea being insufficient to form adduct with all the naphthenic and aromatic hydrocarbons present in said fraction; (2) separating the solid adduct from unadducted hydrocarbons; and (3) decomposing the adduct with vapor consisting of said naphthenic and aromatic hydrocarbons, at a temperature below the melting point of the thiourea.

9. In a process for separating cyclohexane and benzol, the steps of passing a stream of cyclohexane and benzol in gas phase over expanded thiourea, characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, to form an adduct whose hydrocarbon content is enriched in cyclohexane, and passing a stream of cyclohexane vapors over said adduct at a temperature below the melting point of said thiourea to evaporate the cyclohexane and benzol present.

10. In a process for the separation of cyclohexane from methyl cyclopentane, the steps comprising (1) forming an adduct of thiourea by mixing with a hydrocarbon fraction containing cyclohexane and methyl cyclopentane, as the sole reagent solid thiourea in the expanded state characterized by a bulk density of substantially 0.45 gram per cc. and also characterized by reactivity which enables complete adduct formation when said thiourea is used as the sole reagent with liquid cyclohexane in a contact period at room temperature not exceeding one hour; the quantity of said thiourea being insufficient to form adduct with all the cyclohexane and methyl cyclopentane present in said fraction, (2) separating the solid adduct from unadducted hydrocarbons, (3) decomposing the adduct with hot vapor, consisting of cyclohexane and methyl cyclopentane, below the melting point of the thiourea.

11. A method of treating an isobutane-butylene alkylate comprising fractionally distilling the alkylate to produce a fraction A containing those components boiling below about 106° C., and a fraction B containing those components boiling above about 106° C., fractionally distilling B to produce two fractions, one a fraction D containing those components having a boiling range from about 106° C. to about 135° C. and a fraction C containing those components boiling above about 135° C., forming adduct between expanded thiourea characterized by a bulk density of substantially 0.45 gram per cc. and also characterized by reactivity which enables complete adduct formation when said thiourea is used as the sole reagent with liquid cyclohexane in a contact period at room temperature not exceeding one hour, as the sole reagent, and fraction D, the quantity of expanded thiourea being insufficient to form an adduct with all of fraction D, separating the mixture into an adduct and a raffinate F, decomposing said adduct by passing therethrough a hot hydrocarbon vapor at a temperature below 110° C. and for a time substantially sufficient to decompose the adduct and leave a residue consisting substantially of said expanded thiourea, recovering a hydrocarbon fraction E from said hot vapor, said fractions A and E having a high octane number and said fractions C and F having a lower octane number.

References Cited in the file of this patent
UNITED STATES PATENTS

| | | |
|---|---|---|
| 2,386,200 | Drennan | Oct. 9, 1945 |
| 2,386,734 | Wolk | Oct. 9, 1945 |
| 2,499,820 | Fetterly | Mar. 7, 1950 |
| 2,515,134 | Murphree | July 11, 1950 |
| 2,569,985 | Fetterly | Oct. 2, 1951 |
| 2,619,501 | Ray | Nov. 25, 1952 |
| 2,670,343 | Fetterly | Feb. 23, 1954 |

FOREIGN PATENTS

| | | |
|---|---|---|
| 969,716 | France | May 31, 1950 |

OTHER REFERENCES

Angla: "Annales de Chemie," vol. 4 (sec. 2), page 651, 1949.

Zimmerschied et al.: "Crystalline Adducts of Urea with Linear Aliphatic Compounds," presented before a joint symposium on adsorption: The Division of Petroleum Chemistry of the American Chemical Society, Atlantic City meeting September 18–23, 1949, pages 225–240.